Oct. 4, 1955  W. N. WASSON  2,719,441
PROGRESSIVE TRANSMISSION
Filed Feb. 16, 1950  6 Sheets—Sheet 1

INVENTOR.
WAYNE N. WASSON.

BY *Victor J. Evans & Co.*

ATTORNEYS

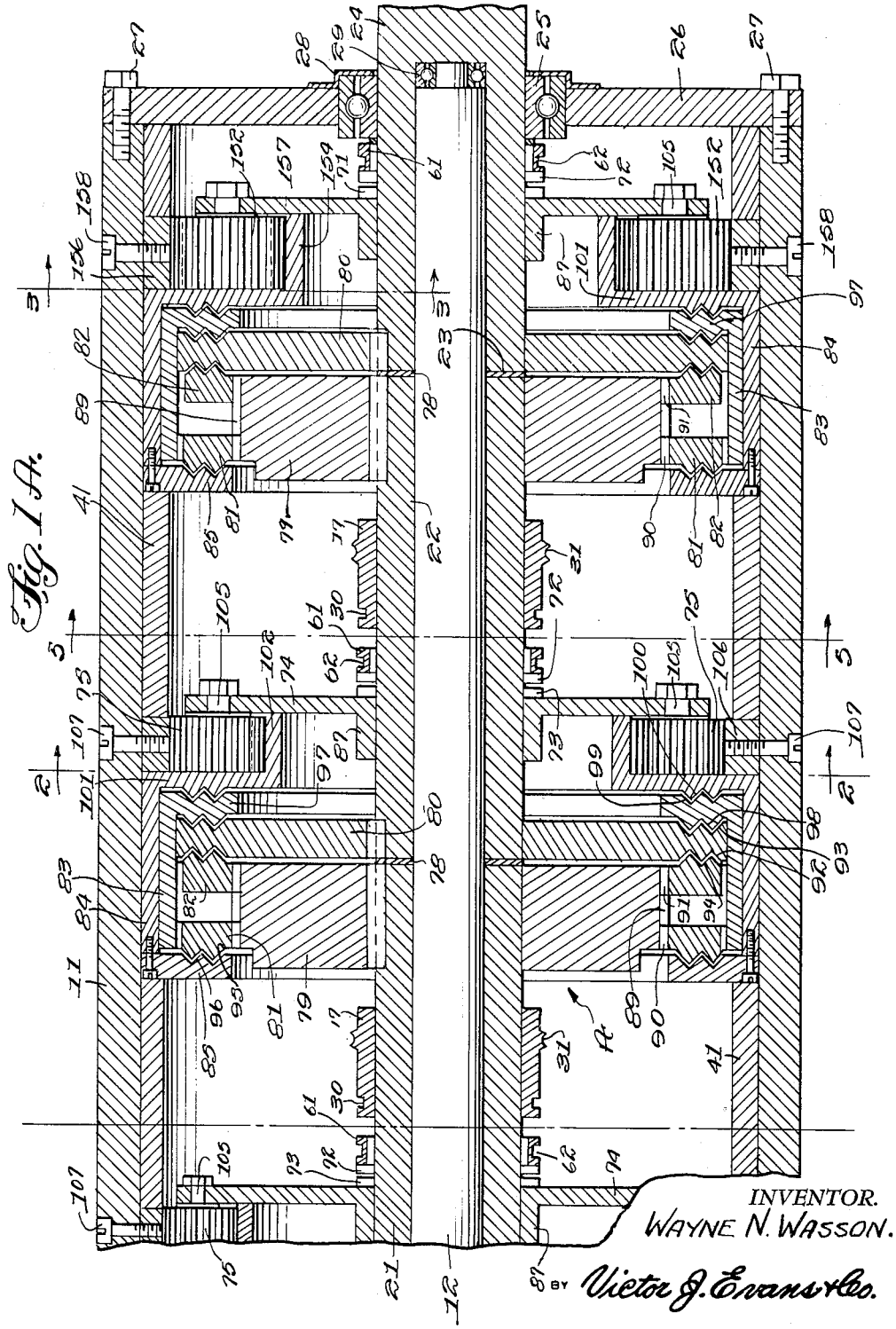

Oct. 4, 1955

W. N. WASSON 2,719,441

PROGRESSIVE TRANSMISSION

Filed Feb. 16, 1950

INVENTOR.
WAYNE N. WASSON.

BY Victor J. Evans & Co.

ATTORNEYS

Oct. 4, 1955  W. N. WASSON  2,719,441
PROGRESSIVE TRANSMISSION
Filed Feb. 16, 1950  6 Sheets-Sheet 4
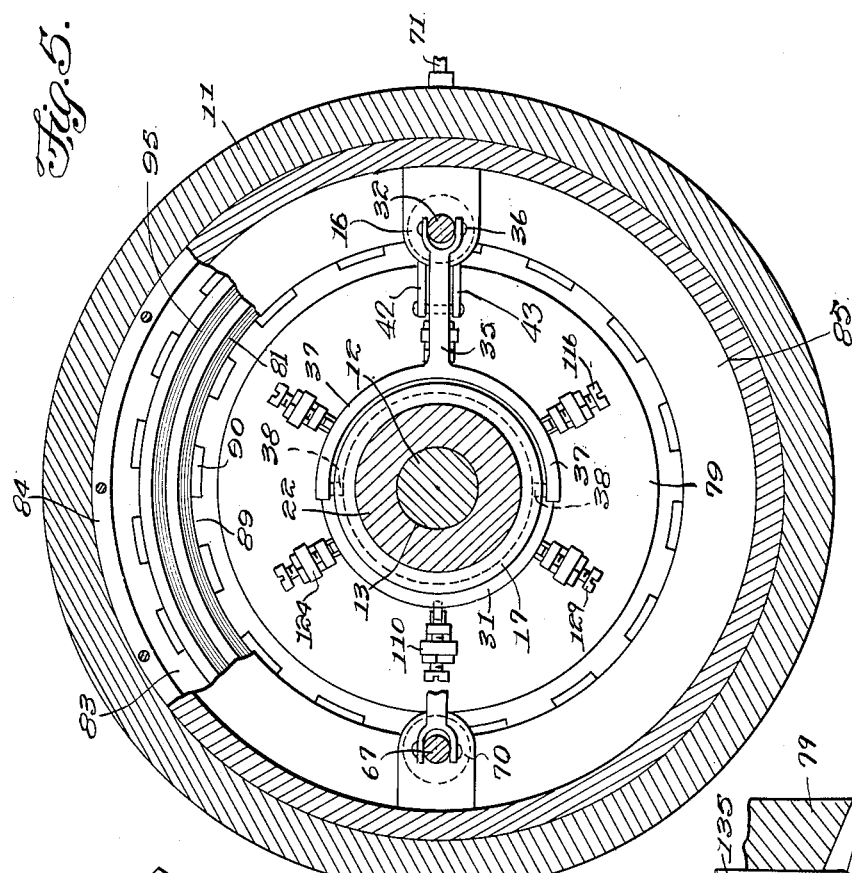
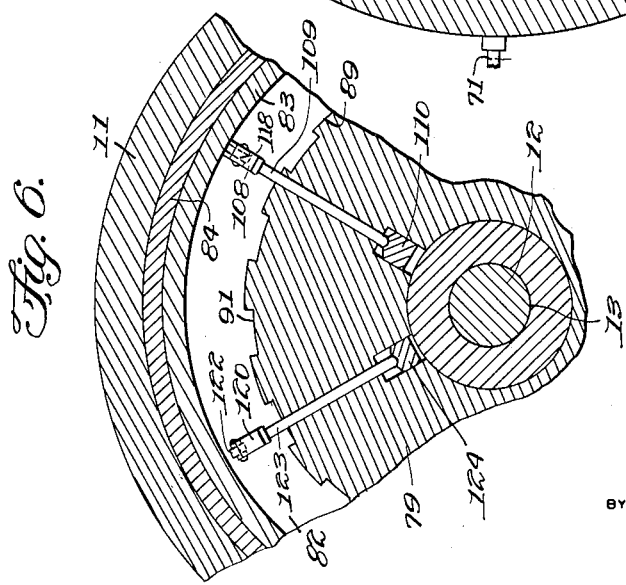
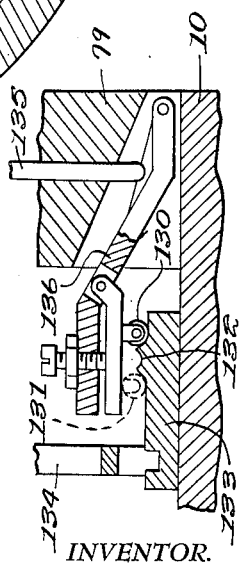
INVENTOR.
WAYNE N. WASSON.
BY *Victor J. Evans & Co.*
ATTORNEYS

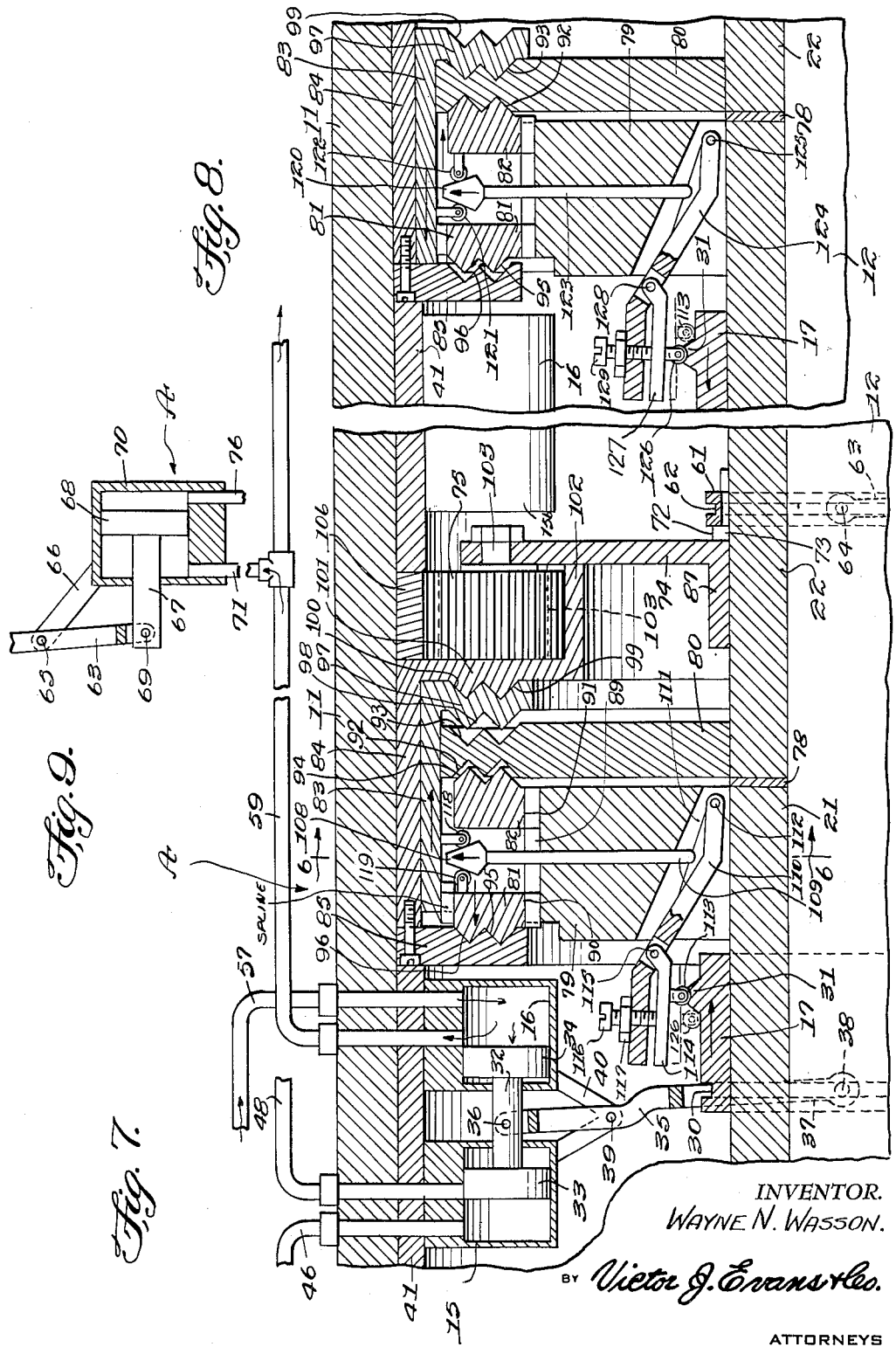

Oct. 4, 1955        W. N. WASSON        2,719,441
PROGRESSIVE TRANSMISSION
Filed Feb. 16, 1950        6 Sheets-Sheet 6
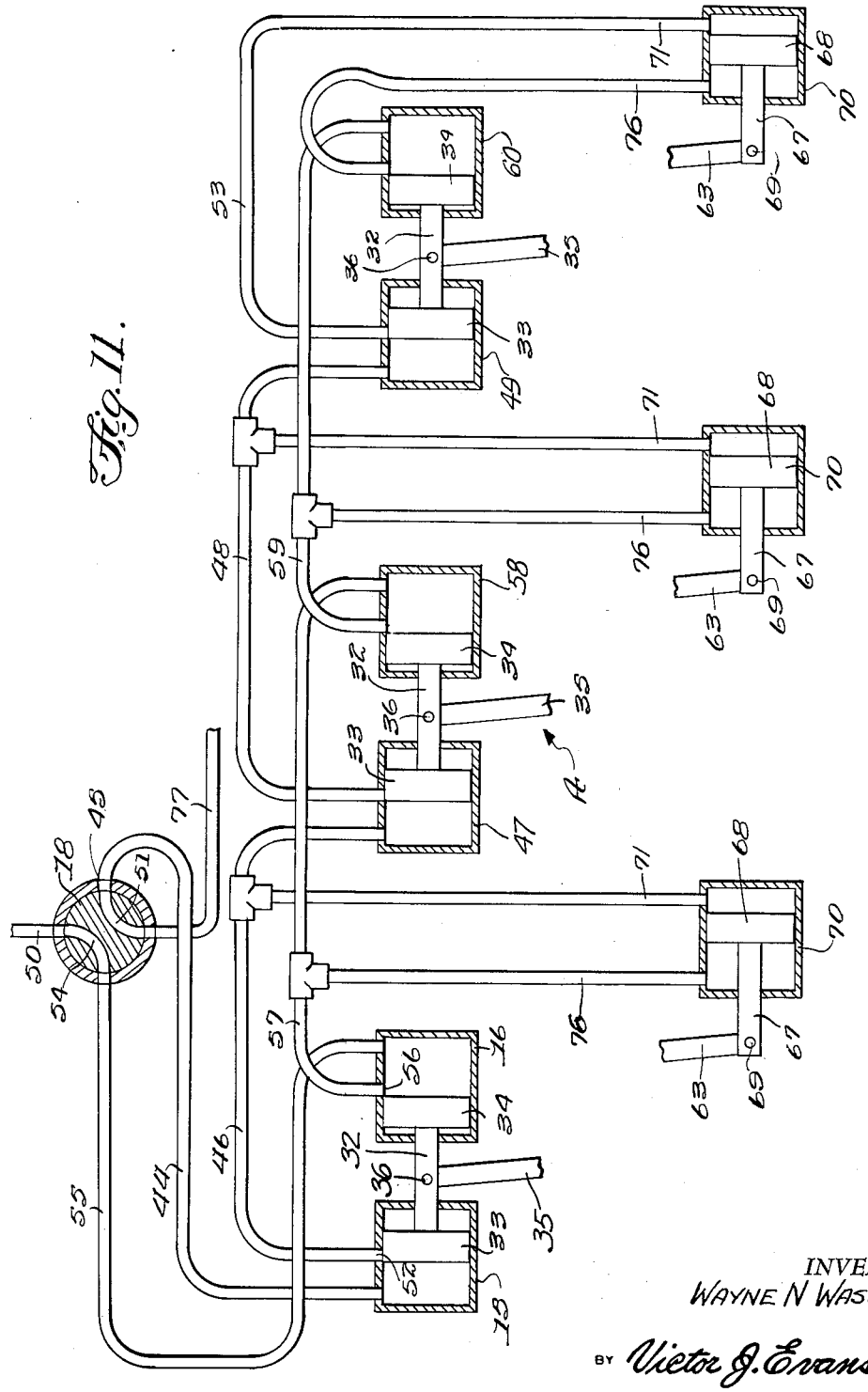
INVENTOR.
WAYNE N WASSON.
BY *Victor J. Evans & Co.*
ATTORNEYS

2,719,441
PROGRESSIVE TRANSMISSION
Wayne N. Wasson, Regina, N. Mex.

Application February 16, 1950, Serial No. 144,470

1 Claim. (Cl. 74—750)

This invention relates to a transmission unit in which a driving shaft operating at a constant speed actuates a driven shaft at a plurality of different speeds and also in reverse, and in particular this invention relates to a transmission unit actuated by a common trip lever or valve whereby a train of speed reducing elements actuated by individual clutch elements are progressively operated, the trip lever or valve being held on until the desired speed is reached.

The purpose of this invention is to provide a progressively actuated transmisison in which a final or the desired speed is obtained by holding a control valve open until clutch elements corresponding with the speed desired are actuated.

In the usual type of transmission gears are shifted by a hand lever to connect gears for different speed to a master gear or driving shaft and in an automatic transmission the transmission operates automatically with changing speed of the vehicle but to obtain greater efficiency it is desirable to provide manual control for a transmission of the automatic type. With this thought in mind this invention contemplates a transmission having a driving shaft and a driven shaft with a plurality of units between the driving and driven shafts and with each unit provided with independently actuated clutch elements which are controlled by a common lever or valve.

The object of this invention is, therefore, to provide means for incorporating a plurality of speed changing units with progressively actuated clutch elements in a common housing wherein the units are progressively controlled.

Another object of the invention is to provide a progressively actuated transmission in which thrust loads of clutch elements therein are equalized.

Another object of the invention is to provide a progressively actuated transmission unit in which a reverse unit is provided.

A further object of the invention is to provide a progressively actuated transmission unit which is of a simple and economical construction.

With these and other objects and advantages in view the invention embodies a driving shaft extended through the center of a cylindrical housing with a tubular driven shaft formed with a plurality of separated elements in which the driven shaft elements are driven through planetary gears with individual clutch elements in the gears and with clutch elements for connecting the sections of the shaft and for connecting the planetary gears to the shaft, and in which hydraulic means is provided for actuating the clutch elements.

Other features and advantages of the invention will appear from the following description taken in connection with the drawings wherein:

Figure 1a is a similar view showing a continuation of the transmission with additional speed reducing elements therein, said section being taken on line 1a—1a of Figure 2.

Figure 2 is a cross section through the transmission being taken on line 2—2 of Figure 1a.

Figure 3 is a detail showing a construction similar to that shown in Figure 2 illustrating gears of different sizes for obtaining a different speed reduction.

Figure 4 is a section similar to that shown in Figure 2 illustrating the reverse gear assembly.

Figure 5 is a cross section through the transmission being taken on line 5—5 of Figure 1a.

Figure 6 is a similar section showing the clutch actuating rods being taken on line 6—6 of Figure 7 and with parts broken away.

Figure 7 is a longitudinal section similar to that shown in Figures 1 and 1a illustrating the clutch elements and hydraulic cylinders by which the clutch elements in the intermediate part of the transmission are actuated.

Figure 8 is a similar section showing one of the alternate sets of cams and levers for driving direct.

Figure 9 is a detail illustrating a clutch actuating cylinder for actuating clutch collars of the intermediate units of the transmission.

Figure 10 is a detail illustrating a clutch element actuating cylinder for actuating clutches to connect the gear carrying discs to the sections of the driven shaft.

Figure 11 is a diagrammatic view illustrating the hydraulic systems for operating the clutch elements with the connecting tubes and with a common control valve connected to the tubes.

Figure 1:
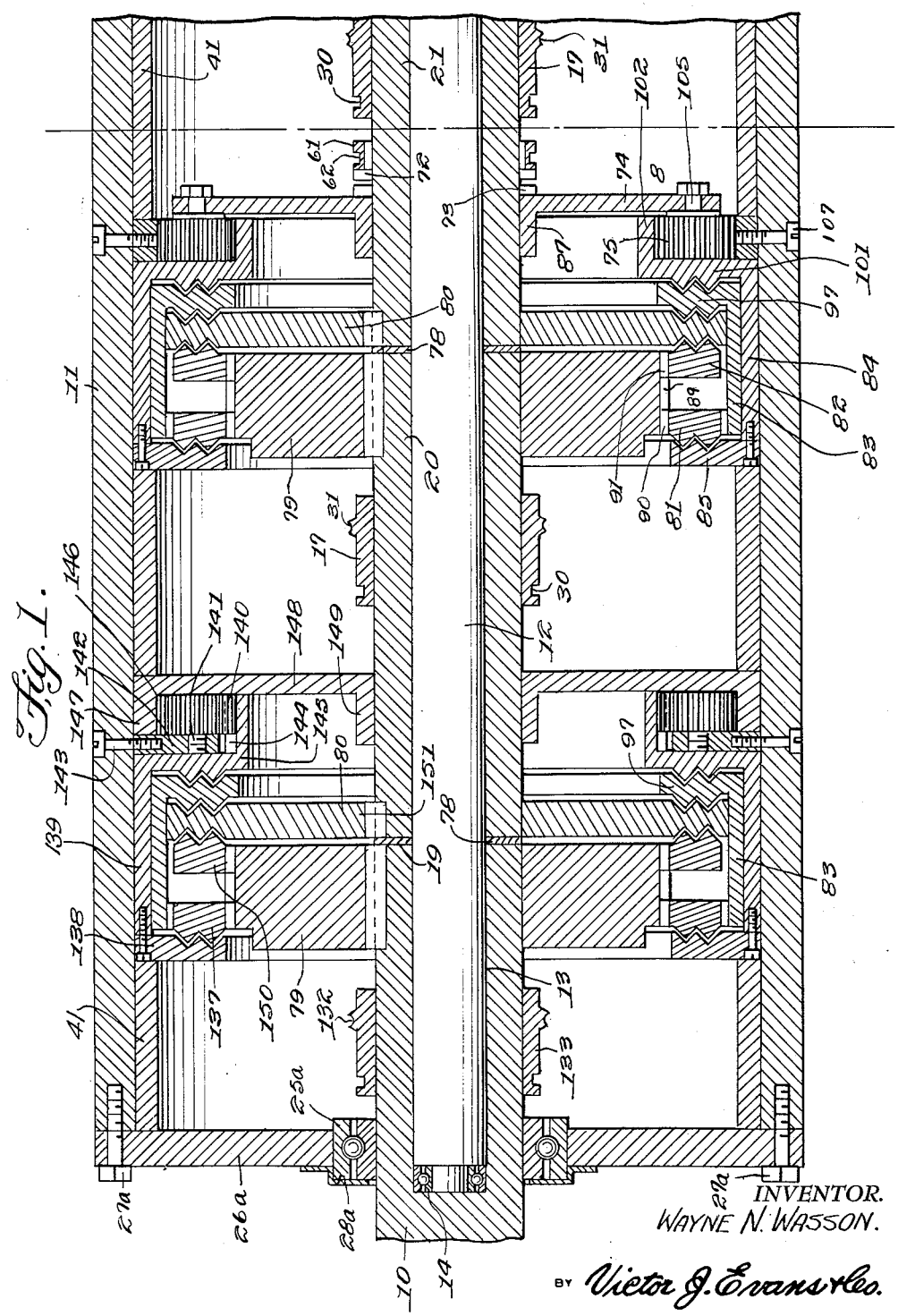
Figure 1 is a longitudinal section through the driving end of the transmission showing the reverse gear with its associated clutch elements and also showing the low gear speed reduction unit, said section being taken on line 1—1 of Figure 2.

Referring now to the drawings wherein like reference characters denote corresponding parts the progressive transmission of this invention includes a driving shaft 10 journaled in a housing 11 with a centrally disposed supporting shaft 12 journaled in an opening 13 in the end of the driving shaft through a bearing 14, and a plurality of hydraulic cylinders 15 and 16 for actuating clutch collars 17 as illustrated in Figure 7 and controlled by a master valve 18 as illustrated in Figure 11.

The driving shaft 10 extends into the housing to the point 19 and a plurality of cylindrical sections 20, 21, and 22, which are journaled on the supporting shaft 12 are positioned between the end of the driving shaft and the end 23 of a driven shaft 24 which is journaled in a bearing 25 in an end plate 26 in the opposite end of the housing 11, as shown in Figure 1a. The plate 26 is secured to the end of the housing by bolts 27 and a cover plate 28 is provided to enclose the bearing 25. The supporting shaft 12 is journaled in the driven shaft 24 by a bearing 29.

The driving end of the shaft is journaled in a bearing 25A in a similar cover plate 26A which is secured to the end of the housing by bolts 27A and the bearing is provided with a cover plate 28A.

Each of the transmission units is provided with a clutch collar similar to the collar 17 and each clutch collar is provided with an annular groove 30 and an annular rib 31. Each unit is also provided with a set of hydraulic cylinders as indicated by the numerals 15 and 16 and a connecting rod 32 extended between pistons 33 and 34 of the cylinders is pivotally connected to a clutch lever 35 by a pin 36 and the clutch lever is provided with a yoke 37 having pins 38 in the ends of arms thereof, which extend into the annular grooves 30 of the collars. The levers 35 are pivotally mounted by pins 39 on brackets 40 extended downwardly from rings 41 in the housing 11 and suspended by plates 42 and 43.

Each of the cylinders 15 is provided with a connection such as the connection 44 that extends to a port 45 of the control valve 18, and also a connection 46 that extends to a cylinder 47 of the next unit, the cylinder 47 being similar to the cylinder 15. The cylinder 47 is also provided with a connection 48 which extends to the cylinder 49 of the next unit.

The valve 18 is provided with a pressure connection 50 and with the valve positioned whereby a passage 51 thereof connects the pressure connection 50 to the port 45 and pressure is applied to the end of the cylinder 15 for driving the piston 33 inwardly and as the piston passes over the port 52 of the connection 46 the fluid under pressure passes through the connection 46 to the cylinder 47.

When the piston of the cylinder 47 passes over the port of the connection 48 the fluid under pressure passes through the cylinder 47 and connection 48 to the next cylinder 49 and when the piston of the cylinder 49 passes over the port of a connection 53 the pressure passes on to the next unit.

When the position of the control valve 18 is reversed whereby fluid under pressure passes from the connection 50 through a passage 54 to a connection 55 the fluid enters the cylinder 16 forcing the piston 34 therein to the position shown in Figure 11 and as the piston passes over the port 56 of a connection 57 the pressure passes to the cylinder 58 of the next unit, which is similar to the cylinder 16, and when the piston of the cylinder 58 passes over the port of a connection 59 fluid passes to the next cylinder 60. This cycle of operations is continued throughout the transmission unit.

Each underdrive unit of the transmission is also provided with a clutch collar 61 having an annular groove 62 therein and these collars are actuated by clutch levers 63 having pins 64 in the arms of a yoke on the end thereof which extend into the groove 62, and the levers are pivotally mounted by pins 65 on brackets 66 with the ends thereof pivotally connected to piston rods 67 of pistons 68 by pins 69.

These clutches are actuated by cylinders 70, which are connected as illustrated in Figure 11 with one end of each cylinder connected by a connection 71 to the connection 46 and when the piston 33 passes over the port 52 so that pressure is supplied to the connection 46 the fluid under pressure passes through the connection 71 to one end of the cylinder 70 moving the piston 68 therein toward the opposite end, and thereby actuating the clutch lever 63 so that teeth 72 on the end of the clutch collar 61 mesh with teeth 73 of a disc 74 upon which gears 75 are carried.

The cylinder 70 is also provided with a connection 76 that extends to the connection 57 so that when the piston 34 is actuated to the position shown in Figure 11 pressure is applied to the opposite side of the piston 68 throwing the clutch collar to the opposite position in which the teeth 72 and 73 are disengaged. Each unit is provided with a cylinder similar to the cylinder 70 and a clutch collar similar to the collar 61 whereby as soon as the clutch collars 17 are actuated by the cylinder similar to the cylinders 15 and 16 the clutch collars 61 are also actuated because the intermediate sections 20, 21 and 22 rotate with the gear carrying discs positioned thereon. The control valve 18 is also provided with a return connection 77 for the egress therethrough of fluid.

The clutch units are provided at the abuting ends of the cylindrical sections 20, 21 and 22 and friction washers 78 are provided between the ends of the sections. Each section is provided with a head 79 that is fixedly mounted on the end of one sleeve, a flange 80 that is fixedly mounted on the end of the abuting sleeve, intermediate rings 81 and 82, an outer ring 83 and a cylinder 84 with a flange 85. Each unit is also provided with a disc similar to the disc 74 and the discs 74 are provided with hubs 87 that extend from one side and a row of teeth 73 that extend from the opposite side. These discs are fixedly mounted through the hubs thereof on the intermediate sections 20, 21 and 22, and also on the driven shaft 24.

The outer peripheral surface of the head 79 is provided with splines 89, and the rings 81 and 82 are provided with splines 90 and 91, respectively that mesh with the splines 89 of the head.

The flange 80 is provided with friction grooves 92 and 93, the ring 82 is provided with corresponding meshing grooves 94 and similar grooves 95 of the ring 81 mesh with grooves 96 of the flange 85. A flange 97 on the opposite end of the ring 83 is provided with grooves 98 that mesh with the grooves 93 of the flange 80 and grooves 99 in the opposite side of the flange 97 mesh with similar grooves 100 in a web 101 of the ring 84. The web 101 of the ring 84 is also provided with a flange 102, the outer surface of which is provided with teeth 103 that mesh with gears 75 which are journaled on pins 105 in the discs 74 and that also mesh with the teeth of a ring gear 106 that is held stationary in the housing 11 by bolts 107.

The intermediate rings 81 and 82 are alternately actuated to frictionally engage the flange 85 of the outer ring 83, or the flange 80, respectively whereby the head 79 rotates either the outer cylinder 84 or the flange 80 which, in turn, rotates the section 22 on the supporting shaft 12.

With the intermediate ring 82 in frictional contact with the flange 80 the head 79 rotates the section 22 at the same speed and with the ring 81 in frictional contact with the cylinder 84 the head 79 rotates the section 22 through the planetary gears whereby the proportionate speed of the section 22 in relation to that of the section 21 is dependent upon the sizes of the gears.

When the rings 82 are in frictional contact with the flanges 80, whereby the gears are not used the cylinders 70 are actuated to disengage the teeth of the clutch collar 61 from the teeth of the disc 74 whereby the planetary gear assembly remains stationary.

The intermediate rings 81 and 82 are actuated by the ribs 31 of the clutch collars 17, as illustrated in Figure 7 wherein cams 108 on radially disposed rods 109 which are slidably mounted in the head are positioned to lock the rings and the cams are actuated through the rods by levers 110 pivotally mounted in slots 111 by pins 112 and the levers are actuated by rollers 113 on arms 114 which are positioned to be engaged by the ribs 31 as the collars 17 slide longitudinally on the shaft sections.

The arms 114 are pivotally connected to the levers 110 by pins 115 and the arms are held by adjusting screws 116 which are provided with lock nuts 117.

The cam and lever assemblies are provided in sets wherein the cams are alternated with the cams of one set shown in Figure 7 and with the cams and levers of the other set positioned as shown in Figure 8.

In Figure 7 the cam 108 is positioned to engage the roller 118 on the ring 83 and also a roller 119 on the ring 81. This set of cams forces the ring 81 longitudinally of the shaft and into frictional engagement with the flange 85 whereby the cylinder 84 is rotated with the head 79 and the transmission is actuated through the planetary gears.

In the design illustrated in Figure 8 a cam 120 is positioned to engage a stationary roller 121 on the ring 83 and also a roller 122 on the ring 82 so that with these cams actuated the intermediate ring 82 is moved into frictional engagement with the flange 80 so that the section 22 is rotated with the section 21 without using the planetary gears. In this design the cams 120 are carried by rods 123 that are slidably mounted in the head 79 and the rods are actuated by levers 124 similar to the levers 110, the levers being pivotally mounted in the head by pins 125 and having rollers 126 carried by arms 127 which are pivotally mounted on the levers by pins 128 and held with adjusting screws 129. With this set of cams the rollers 126 are positioned to be engaged by the rib 31 when the clutch collar is shifted by the piston 33 whereas the set of cams 108 are actuated by the ribs 31 with the clutch collar actuated by the piston 34 in the cylinder 16. The rollers 126 are, therefore, positioned in a plane spaced from that of the rollers 113 as shown in dotted lines in Figures 7 and 8 and each set of rollers is positioned to be engaged by the rib 31 of its clutch collar.

In the design illustrated in Figure 10 the levers for actuating the forward and reverse drives are illustrated wherein a set of rollers 130, similar to the rollers 126 are spaced from another set as indicated by the dotted lines 131 and a rib 132 on a collar 133 is positioned to extend between the two sets of rollers in the neutral position, and when the clutch collar 133 is actuated by a clutch lever 134 which lever 134 is actuated independently of the progressive hydraulic control system for the underdrive units to selectively obtain forward or reverse drive through said units so that the rib 132 actuates the rollers 130 the cams are actuated by the rods 135 through the levers 136 to move the intermediate ring 137, similar to the ring 81 into frictional engagement with the flange 138 of the cylinder 139 thereby actuating reverse gears 140 that are rotatably mounted on pins 141 in studs 142, changing the direction of rotation whereby the driven shaft is operated in reverse. The studs 142 are secured in the housing 11 by screws 143 and the gears 140 mesh with gear teeth 144 of a flange 145 of the cylinder 139 and also with gear teeth 146 in the inner surface of a flange 147 of a disc 148 similar to the disc 74 that is fixedly mounted on the shaft section 20 through a hub 149 thereof.

With the clutch collar 133 actuated whereby the rib 132 raises the rollers 131 the cams actuate the intermediate ring 150, similar to the ring 82 and the driven shaft is rotated in the same direction as that of the driving shaft and at full speed ahead, the ring 150 being in frictional engagement with the flange 151, similar to the flange 80.

In the design illustrated in Figure 3 the gears or planet pinions 152, similar to the gears 75 are carried by discs of the cylindrical sections of the shaft and these gears mesh with teeth 153 of a flange 154 similar to the flange 102 of the cylinder 84 and teeth 155 of an outer ring gear 156 similar to the ring 106. The ring gear 156 is fixedly mounted in a sun gear 157 similar to the housing 11 by screws 158. These parts are similar to corresponding parts of the intermediate units except that the pinions are of a larger size.

It will be understood, therefore, that each unit may contain gears of a different size so that one unit may drive with one speed and another with another and with the sizes of the planetary gears gradually increasing the speed will gradually progress from slow to full speed ahead.

It will also be understood that the collars 17 of each unit are provided with cylinders similar to the cylinders 15 and 16 for actuating the clutch levers and the rings 81 and 82 are also provided with cams similar to the cams 108 and 120, and these cams are actuated by levers similar to the levers 110 and 124, all as illustrated in Figures 7 and 8. These parts are omitted from the open spaces between the units for the purpose of illustration.

From the foregoing it will be apparent that there has been provided a transmission unit wherein a driving shaft and a driven shaft have a plurality of assemblies therebetween with independently actuated clutch elements which can be controlled by a common lever or valve. A plurality of speed changing mechanisms are provided in a common housing with progressively actuated clutch elements so that the mechanisms can be progressively controlled. Further, the thrust loads of clutch elements are equalized and there is provided a reversing unit or assembly. In use the shaft 10 may be driven by any suitable source of supply and a supporting shaft 12 is journaled in an opening 13 in the end of the driving shaft. Hydraulic cylinders 15 and 16 are provided for actuating the clutch collar 17 and cylindrical sections 20, 21 and 22 are journaled on the supporting shaft 12. The plate 26 is secured to the housing and the supporting shaft 12 is journaled in the driven shaft 24 by a bearing 29. There is provided a clutch collar for each of the transmission mechanisms and a connecting rod 32 extends between the pistons 33 and 34 of the cylinders. A pressure connection 50 is provided for the valve 18 so that by properly positioning the valve there will be provided a connection to the port 45 so that pressure can be applied to the end of the cylinder 16 for actuating the piston 33.

In use the piston 33 moves over the port 52, the fluid under pressure passes through the connection 46 to the cylinder 47 and after the piston of the cylinder 47 has passed over the port of the connection 48, the fluid then passes through the cylinder 47 and connection 48 to the next succeeding cylinder 49. Then, when the piston of the cylinder 49 passes over the port of a connection 53 the pressure passes on to the next unit and this cycle of operation is repeated.

After the control valve 18 has been reversed, fluid under pressure passes from the connection 50 through a passage 54 and the fluid enters the cylinder 16 to force piston 34 to the position shown in Figure 11. When the piston of the cylinder 58 passes over the port of a connection 59 the fluid passes to the next cylinder 60 and this cycle of operation is continued throughout the transmission assembly.

The clutches are actuated by cylinder 70 so that when the piston 33 passes over the port 52 pressure is supplied to the connection 46 and the fluid under pressure passes through the connection 71. When the piston 34 is actuated to the piston shown in Figure 11 pressure is applied to the opposite side of the piston 68 to thereby throw the clutch collar to the opposite position in which the teeth 72 and 73 are disengaged.

By alternately actuating the intermediate rings 81 and 82, the flange 85 of the outer ring 83 is engaged or the flange 80 is engaged so that the head 79 rotates the outer cylinder 84 or the flange 80 to thereby rotate the section 22 on the shaft 12. When the ring 82 frictionally engages the flange 80, the head 79 rotates the section 22 at constant speed and the head 79 rotates the section 22 when the ring 81 frictionally engages the cylinder 84, this being accomplished by the planetary gears which provide a proportional speed of the section 22 relative to the section 21.

As shown in Figure 7 the cam 108 engages the roller 118 and the ring 81 frictionally engages the flange 85 so that the cylinder 84 is rotated with the head 79 so that the transmission is energized through the planetary gears. The rollers 126 are adapted to be engaged by the rib 31 when the clutch collar is shifted by the piston 33 so that the set of cams 108 are acauted by the ribs 31 when the clutch collar is actuated by the piston 34 in the cylinder 16.

The structure shown in Figure 10 shows the means for actuating the forward and reverse drive so that when the clutch collar 133 is actuated by the lever 134, the rib 132 actuates the rollers 130 and the cams are actuated by the rods 135 through the levers 136 to move the ring 137 into engagement with the flange 138 of the cylinder 139. When the collar 133 is actuated the rib 132 raises the rollers 131 and the cams actuate the intermediate ring 150 which frictionally engages the flange 151. Thus, it will be seen that there has been provided a transmission whereby the driving shaft operating at a constant speed actuates the driven shaft at a plurality of different speeds and also in reverse.

Any suitable number of units can be combined in one transmission housing and the gears can increase or decrease in size as is necessary. Referring in detail to Figure 11, there is shown the control valve 18 which is arranged so that fluid is supplied to cylinder 16 through the conduit 55 so that the piston 34 uncovers the port 56 and fluid under pressure will pass through to the next cylinder and this cycle will be completed until the required speed is desired, at which time the valve 18 will close. Thus, the valves 18 will be held open only until the first unit is actuated so that the vehicle is started in low gear. Or, by holding the lever with the valve open a longer period of time until the fluid reaches the subsequent unit, the next gear or the intermediate gear is operated so that the clutches will be actuated by the second cylinder. Then, by holding the valve open for a longer period of time, or until the fluid reaches the cylinder of the next unit, the clutches of the next speed unit will be actuated. Simultaneously, as the fluid under pressure passes from one unit to another it also passes through the cylinder 70 which actuates the clutch collar 71 to engage or disengage the teeth 72 and 73 so that whenever a unit is not used the planetary gears of this unit are inoperative. Thus, the transmission may be used to obtain substantially any speed desired, and also to drive the vehicle in reverse.

What is claimed is:

In a progressive transmission, the combination which comprises a drive shaft, a driven shaft aligned with the drive shaft and spaced therefrom, an auxiliary shaft extended into the ends of the drive and driven shafts, intermediate cylindrical shaft sections journaled on said auxiliary shaft and positioned between the ends of the drive and driven shafts, a housing in which said shafts are journaled, disc like heads fixedly mounted on the ends of the cylindrical shaft sections and shafts, gear rings having frictional gripping surfaces splined to the peripheral surfaces of the heads, cylinders with flanges in the ends positioned over the said rings, flanges positioned on the ends of adjoining shaft sections with friction gripping surfaces on the faces thereof, cams positioned to urge the rings positioned on the heads into frictional gripping action with the flange positioned on an adjoining shaft section and also into friction gripping relation with a cylinder, cams positioned between the rings carried by the head, planetary gears, said cams being divided into sets with one set positioned to actuate the ring that coacts with the flange on the adjoining shaft section and the other set positioned to actuate the ring that frictionally engages the flange of the cylinder that coacts with the planetary gears which are rotatably mounted on a disc fixable to said adjoining shaft section for changing the speed of the driven shaft, clutch collars positioned on the shaft, levers actuated by the clutch collars and positioned to actuate the cams, and hydraulic cylinders positioned to actuate the said clutch collars to operate either set of cams said hydraulic cylinders being operable to progressively actuate said clutch collars.

References Cited in the file of this patent

UNITED STATES PATENTS

| | | |
|---|---|---|
| 686,786 | Upton | Nov. 19, 1901 |
| 1,159,018 | Hall | Nov. 2, 1915 |
| 1,594,239 | Briais | July 27, 1926 |
| 1,672,868 | Brown et al. | June 12, 1928 |
| 1,792,093 | Holmes | Feb. 10, 1931 |
| 2,052,815 | Wilsing | Sept. 1, 1936 |
| 2,094,449 | Forichon | Sept. 28, 1937 |
| 2,395,459 | Carnagua | Feb. 26, 1946 |
| 2,426,063 | Stevens | Aug. 19, 1947 |
| 2,472,788 | Burrus | June 14, 1949 |
| 2,599,632 | Hindmarch | June 10, 1952 |